April 13, 1954 L. P. GROBEL 2,675,493
LEAK DETECTION SYSTEM FOR LIQUID-COOLED GENERATORS
Filed April 24, 1953
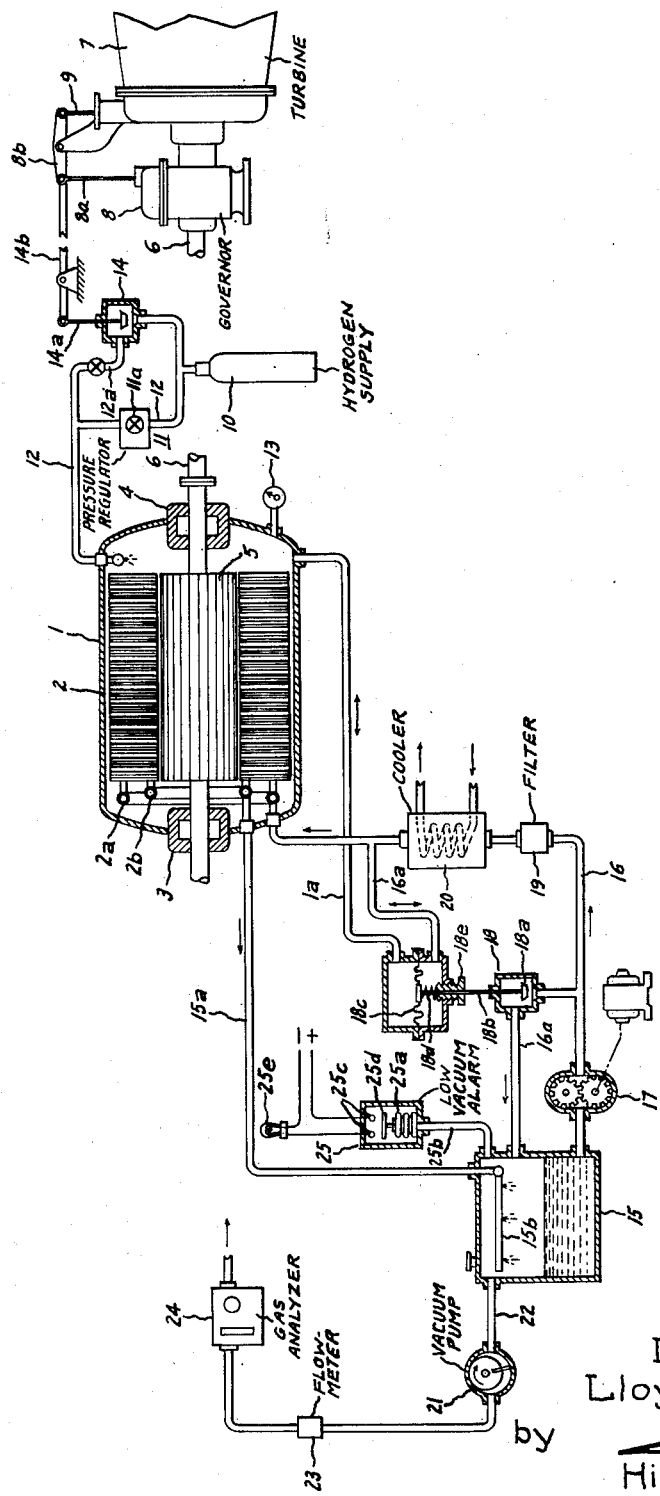
Inventor:
Lloyd P. Grobel,
by
His Attorney.

Patented Apr. 13, 1954

2,675,493

UNITED STATES PATENT OFFICE 2,675,493

LEAK DETECTION SYSTEM FOR LIQUID-COOLED GENERATORS

Lloyd P. Grobel, Schenectady, N. Y., assignor to General Electric Company, a corporation of New York Application April 24, 1953, Serial No. 350,980

7 Claims. (Cl. 310—53)

This invention relates to very large capacity electric generators or like dynamo-electric machines of the hydrogen-cooled type, particularly to a system for detecting leakage in conduits used to circulate a liquid coolant through the laminated stator of the generator.

It has previously been suggested that the rating of a large electric generator could be increased very substantially by improved methods of removing the heat generated in the rotor and stator. Most effective heat removal is obtained when the cooling fluid is circulated in direct contact with the electric conductors, or circulated through passages formed within the conductor itself. Improved arrangements for such "direct-cooled" generators are disclosed in the copending application of Charles E. Kilbourne, Serial No. 333,512, filed January 27, 1953, and assigned to the same assignee as the present application. In extremely large generators of this type, the sealed casing is filled with a suitable gas (ordinarily hydrogen) under pressure. Cooling liquid for the armature windings is introduced by suitable piping communicating with an annular liquid distributing manifold connected to the respective conductor bars, and removed by way of a similar annular manifold. Ordinarily, these coolant manifolds will be arranged at the end of the casing opposite that from which the electrical connections to the coils are taken.

An important problem in such generators arises from the fact that the liquid employed for cooling the stator windings may have a very deleterious effect on the electric insulation which separates the conductors from the stator core laminations. Because of the high degree of reliability which must be built into a machine of this type, it is absolutely essential that any smallest leak in the cooling liquid circuit be detected immediately.

Accordingly, an object of the present invention is to provide improved leak-detecting arrangements for a hydrogen-cooled generator having a liquid-cooled stator of the type described.

Other objects and advantages will become apparent from the following description taken in connection with the accompanying drawing, in which the single figure represents diagrammatically a large hydrogen-cooled generator having a liquid coolant system for the stator windings.

Generally stated, the invention is practiced by maintaining the hydrogen inside the generator casing at a pressure which will ordinarily be held constant at a preselected value, but may be caused to vary as a function of the load on the machine, then maintaining the liquid coolant circuit at a preselected pressure differential below the pressure of the hydrogen, and providing one or more devices for detecting the presence of hydrogen in the circulating coolant liquid.

Referring now more particularly to the drawing, the invention is disclosed as applied to a hydrogen-cooled generator, which may be of a capacity on the order of 200,000 kw., having a casing 1 containing the stator 2 and bearings 3, 4 supporting the rotor 5. The righthand end of the rotor 5 is coupled to the power output shaft 6 of a steam turbine 7, only the inlet end of which is shown. The turbine has suitable governing mechanism illustrated diagrammatically at 8 as arranged to position the steam inlet valve stem 9 by means of a push-rod 8a and a lever 8b pivoted on the turbine frame in a manner which will be apparent from the drawing. It will be understood that downward movement of the rod 8a causes the valve stem 9 to rise and open the turbine valves in accordance with an increase in load demand.

As will be appreciated by those familiar with hydrogen-cooled generators, the bearings 3, 4 have associated therewith suitable shaft-sealing devices for preventing escape of hydrogen, the details of which are not material to an understanding of the present invention. The hydrogen is supplied from a suitable source, such as one or more storage cylinders 10. Ordinarily, the pressure of the hydrogen within the generator casing will be controlled automatically by a suitable pressure regulator 11 having a manual pressure-selecting handwheel 11a, the pressure in the generator being read from the gage 13. This pressure will ordinarily be maintained at a value which is changed by the operator as the load output on the generator varies. During the periods of low load operation, the hydrogen pressure may be kept as low as one-half pound per square inch, gage. Then when the load increases so that a greater rate of heat removal is required, the valve 11a will be adjusted and the pressure in the casing 1 increased, to perhaps on the order of thirty pounds per square inch at full load. The resulting increase in the density of the hydrogen gives the extra cooling effect required.

It is also contemplated by the invention that the pressure of the hydrogen in the casing 1 may be caused to vary automatically in accordance with changes in the load output of the power-plant. One way to accomplish this is illustrated very diagrammatically in the drawing in the form of the parallel conduit 12a having a regulating valve 14 so connected to the turbine governing linkage 8a, 8b, 9 that the flow of hydrogen from the reservoir 10 to the casing 1 will vary as some preselected function of the turbine load. It will be obvious from a consideration of the drawing that downward movement of the push-pull rod 8a to open the turbine valves will also cause upward movement of the stem 14a of the hydrogen regulating valve 14, by reason of the interconnecting lever 14b. This is a very crude representation of the broad idea, and in actual practice the device 14 would very likely be a much more complicated pressure regulating apparatus, like that shown at 11, and having adjustable means for determining the pressure level to be maintained. The valve stem 14a would then represent the pressure level selecting member of the regulator. Many equivalent arrangements for performing this function will occur to those familiar with the art.

The liquid-cooling system for the stator 2 comprises a pair of concentric annular manifolds 2a, 2b. The inlet manifold 2a supplies coolant to suitable fittings associated with the armature bar structure, as described more particularly in the above-mentioned application of C. E. Kilbourne. Likewise, the annular manifold 2b receives the spent coolant from the respective stator bars for return to the storage tank 15, by return conduit 15a.

Coolant is supplied to the inlet header 2a by a conduit 16. Coolant from tank 15 is received by a pump 17 and delivered through a regulating valve 18 to a suitable filter 19 and water-cooled heat exchanger 20. It will be apparent that the pump 17 may be any suitable pump, such as the positive displacement gear pump shown, and may be driven by any suitable means such as an electric motor, or a small turbine, or may be geared to the shaft of turbine 7.

The function of the valve 18 is to control the supply of coolant so as to maintain a preselected pressure difference between the liquid cooling circuit and the hydrogen within casing 1, the hydrogen pressure being perhaps four pounds per inch higher than the liquid coolant pressure. To this end, valve 18 comprises a flow control disk member 18a having a stem 18b positioned by a pressure responsive diaphragm 18c biased in the valve opening direction by a spring 18d. The force exerted by spring 18d may be adjusted by suitably positioning the threaded adjusting bushing 18e. The lower side of diaphragm 18c is subjected to coolant supply pressure in conduit 16 by way of the pressure-sensing conduit 16a. The opposite side of the diaphragm is subjected to hydrogen pressure by way of the pressure-sensing conduit 1a.

It will be apparent that the force exerted by the adjustable spring 18d determines the pressure differential which will be maintained between the coolant liquid and the hydrogen. The above-mentioned differential of four pounds per square inch is believed sufficient to effect the leak detection function to which the present invention is specifically directed.

While not essential to an understanding of the present invention, it may be noted that the cooling liquid may be a suitable dielectric oil such as those known to the electrical trade as "Transil" oil or "Pyranol." It is important that a liquid be used having a comparatively low vapor pressure, for reasons which will become apparent from the following description of the leak detection apparatus.

A comparatively high vacuum pump 21 is arranged to draw gases from above the liquid in tank 15 by way of conduit 22. Specifically, this pump may be of a type capable of maintaining a vacuum on the order of one-quarter inch of mercury absolute in the tank 15. The gases discharged by pump 21 pass through a suitable flowmeter 23 and a gas analyzer 24 the function of which is to detect the presence of even small quantities of hydrogen. In addition to flowmeter 23 and gas analyzer 24, a third leak detecting device is present, in the form of the low vacuum alarm 25, represented diagrammatically as comprising a flexible bellows 25a to which the pressure in the tank 15 is communicated by a pressure-sensing conduit 25b. When the pressure in tank 15 rises to a preselected value, the electrical contacts 25c are bridged by the conductive member 25d carried by the free end of the flexible bellows, thus completing the circuit to a signal device such as the signal lamp 25e.

The operation of the system will be evident from the above description of the structure. The admission of steam to the turbine 7 is determined by the automatic governing mechanism 8, and the pressure of the hydrogen in generator casing 1 is adjusted, roughly in accordance with the load on the turbine, either manually by the valve pressure-selecting wheel 11a or automatically by the regulating device 14, as described above. The coolant regulator 18 then maintains the preselected pressure differential between the coolant liquid in conduit 16 and the pressure of the hydrogen in the casing 1. Thus, the pressure differential required for effective performance of the leak detecting function is always maintained, regardless of changes in the load on the turbine with the accompanying changes in the pressure of the hydrogen in the generator.

In the event of even a small leak in the liquid coolant conduits inside the generator casing, the pressure differential will cause leakage of hydrogen into the liquid coolant circuit, rather than leakage of coolant into the generator windings. Any such entrained hydrogen will be caused to separate from the liquid in the liquid spray discharged from the spray pipe 15b. The non-condensible gases are then drawn off by the vacuum pump 21. Any small trace of hydrogen will be instantly detected by the gas analyzer 24, which of course may be arranged to actuate suitable signalling or alarm mechanism (not shown). In the event of a larger leak, the increased rate of gas flow discharged by vacuum pump 21 will be detected by the flowmeter 23. And in the event of an extremely large leak, the pump 21 will become incapable of maintaining the preselected vacuum in the tank 15, with the result that the low vacuum alarm 25 will be actuated.

Thus, the arrangement disclosed provides three-way protection for signalling immediately a dangerous leak in the liquid cooling circuit. It will be obvious to those familiar with the art that many equivalent mechanical or chemical devices might be used to detect the presence of an excessive amount of gas entrained in the coolant liquid.

The flow regulating device 18 acts to vary the quantity of liquid by-passed to reservoir 15 through conduit 16a, as compared with that discharged into the supply conduit 16. It will, of course, be apparent that other equivalent regulating devices for determining the pressure in conduit 16 could be used. For instance, the positive displacement pump 17 might be replaced with a centrifugal type pump driven by a variable speed motor, the speed of which is controlled by a pressure-responsive device analogous to the pressure differential sensitive valve 18. As indicated above, the means for varying the pressure of the hydrogen in casing 1 in accordance with the load output of the plant could also take many forms. And, the number and type of leak-detecting devices could vary from that illustrated herein.

The appended claims are of course intended to cover all such modifications as fall within the true spirit and scope of the invention.

What I claim as new and desire to secure by Letters Patent of the United States is:

1. In leak detecting apparatus for a dynamoelectric machine having a sealed casing containing hydrogen under pressure and conduits for circulating a coolant liquid through the armature stator, the combination of regulating means for varying the pressure of the hydrogen in the casing, conduit means for supplying a coolant liquid to the stator cooling passages, means for automatically maintaining the pressure in the coolant liquid supply conduit at a preselected pressure differential below that of the hydrogen, means for separating entrained non-condensible gases from the spent coolant discharged from the machine, vacuum pump means for drawing off such non-condensible gases, and means for detecting the presence of hydrogen in said gases.

2. In leak detecting apparatus for a dynamoelectric machine having a sealed casing containing a gaseous coolant and having passages for conducting a liquid coolant through portions of the machine structure, the combination of means for causing the pressure of the coolant gas within the machine to vary, means for supplying a coolant liquid to said passages, means for automatically maintaining the pressure of the coolant liquid at a preselected pressure differential below that of the coolant gas in the machine, vacuum pump means for drawing off non-condensible gases from the spent liquid coolant discharged from the machine, and means for detecting the presence of gaseous coolant in said gases.

3. Apparatus in accordance with claim 2 in which the leak detector means comprises a gas analyzer for detecting the presence of coolant gas in the gases separated from the coolant liquid.

4. Apparatus in accordance with claim 2 in which the detecting means comprises a flowmeter for measuring the rate of flow of non-condensible gases discharged by the pump.

5. Apparatus in accordance with claim 2 in which the leak detecting means comprises a pressure-responsive low vacuum alarm constructed to effect actuation of a signal device when the quantity of non-condensible gases drawn off from the coolant liquid exceeds the capacity of the vacuum pump.

6. In a liquid-cooling system for certain components of a gaseous coolant-filled dynamoelectric machine, the combination of means for regulating the pressure of the gaseous coolant in the machine in accordance with the load output thereof, means for supplying a coolant liquid to the machine at a preselected pressure differential below that of the coolant gas therein, means for separating entrained gases from spent coolant liquid discharged from the machine, vacuum pump means for drawing off gases separated from the coolant, and means for detecting the presence of gaseous coolant in said gases.

7. A gas and liquid-cooled dynamo-electric machine in accordance with claim 6 in which the liquid coolant supply means comprises a positive displacement pump, a by-pass conduit from the discharge side of the pump to the inlet side thereof, valve means controlling the flow of coolant returning through said by-pass, and a pressure-responsive servo-motor for controlling said valve in accordance with the differential existing between the pressure of the coolant liquid supplied to the machine and the pressure of the gaseous coolant therein.

No references cited.